3,054,763
STYRENE MODIFIED ISOPHTHALIC ALKYDS
Benjamin A. Bolton, Gary, Ind., assignor to Standard Oil Company, Chicago, Ill., a corporation of Indiana
No Drawing. Filed Mar. 31, 1959, Ser. No. 803,078
6 Claims. (Cl. 260—22)

This invention relates to a styrenated alkyd resin utilizing isophthalic acid as the dibasic acid reactant.

An object of the invention is a styrenated oil-modified alkyd resin having superior bake hardness and resistance to aqueous alkali metal hydroxide, as compared to conventional phthalic anhydride (PAN) resins. Other objects of the invention will become apparent in the course of the detailed description.

The superior styrenated oil-modified alkyd resin of the invention is prepared from castor oil fatty acids, tall oil fatty acids, pentaerythritol, benzoic acid, and styrene. The necessary amounts of castor oil fatty acids, tall oil fatty acids, pentaerythritol, and benzoic acid are first reacted in proportions as hereinafter defined. The reaction product mixture of this first reaction is then condensed with isophthalic acid to produce an alkyd resin. The alkyd resin is then reacted with styrene to obtain the styrenated isophthalic alkyd resin of the desired properties.

The castor oil fatty acids and tall oil fatty acids are utilized in a weight ratio from about 20/80 to 30/70 and preferably 25/75. It is to be understood that a ratio of 25/75 means 25 parts by weight of castor oil fatty acid and 75 parts by weight of tall oil fatty acid. The castor oil fatty acids and the tall oil fatty acids are the usual items of commerce.

The polyol utilized herein is pentaerythritol. The pentaerythritol may be essentially pure or may be the various grades known to commerce. The commercial material sold as technical grade pentaerythritol which is on the order of 88 percent pentaerythritol and the remainder a mixture of di-pentaerythritol and tri-pentaerythritol is particularly suitable in preparing the composition of the invention.

The pentaerythritol and benzoic acid are utilized in amounts such that the ester theoretically produced contains from 2.7 to 2.9 free hydroxyl groups; the theoretical ester product of pentaerythritol and benzoic acid is a mixture of molecules containing various numbers of hydroxyl groups reacted with acid—the hydroxyl groups are not reacted will average from 2.7 to 2.9 per molecule of ester present in said ester product. Particularly good results are obtained with an ester product containing on the average of 2.8 free hydroxyl groups per molecule.

The ester product of pentaerythritol and benzoic acid may be prepared along with the castor oil fatty acids and tall oil fatty acids in a single vessel. Or, the pentaerythritol and benzoic acid may be reacted separately and the ester product added to the vessel containing the defined fatty acids. The defined fatty acids and the defined ester product are subjected to reaction in an inert atmosphere at a temperature between about 400° F. and 475° F. with continuous removal of water formed in the reaction. The fatty acids and ester are contacted in this reaction vessel until substantial cessation of evolution of water.

The alkyd resin is prepared by conventional polycondensation reaction of isophthalic acid and the fatty acid-ester reaction product mixture previously prepared. The isophthalic acid and other reactants for the preparation of the alkyd resin are present in amounts such that the polyol affording ester is present in an excess over the theoretical requirement of between about 10 to 20 mol percent and the defined fatty acids are present in an amount such that the oil-length of the alkyd resin is about 50 percent. Herein it is desired that the oil-length be held between about 45 and 55 percent.

The alkyd resin is prepared by contacting the reactants in an inert atmosphere at a temperature between about 400° F. and 525° F. with continuous withdrawal of water of reaction. The polycondensation reaction is continued until the alkyd resin condensation product has an acid number between about 12 and 20 and a cure time between about 50 and 70 seconds.

The styrenated alkyd resin product of the invention is obtained by reacting the above defined alkyd resin with styrene. The styrene is used in an amount of about 30 to 45 weight percent based on alkyd resin; particularly good results are obtained at a usage of about 35 weight percent. The styrenation reaction is carried out in the presence of a peroxy catalyst suitable for such reaction. The styrenation reaction is carried out in an inert atmosphere at a temperature between about 275° F. and 350° F.; the time of reaction is determined by the cure time desired and is continued until the styrenated oil-modified alkyd resin has a cure time of from 0–15 seconds and preferably 0–5 seconds.

When the final product has a cure time in the range of 0–5 seconds the styrenation reaction time-temperature relationship is substantially three hours at 300° F., two hours at 315° F., and one hour 325° F.

It has been found that better results are obtained, particularly with respect to time, when the peroxy catalyst used is introduced in part admixed with the alkyd resin and in part with the styrene; however, satisfactory product is obtainable in a longer time when all of the catalyst is introduced with the styrene.

*Illustrative Embodiment*

A styrenated alkyd resin illustrative of the product of the invention and a closely similar—in terms of reaction conditions and amounts—of a conventional phthalic anhydride resin are set out hereinafter. Reactants used were commercial 9–11 castor oil fatty acids; commercial distilled tall oil fatty acids which contained about 2 percent of rosin; essentially pure benzoic acid; essentially pure commercial phthalic anhydride; essentially pure isophthalic acid; and pentaerythritol. The pentaerythritol was a commercial technical grade which had a pentaerythritol content of about 88 percent and a combining weight of 36.2.

The fatty acids, the pentaerythritol, and the benzoic acid were charged to a vessel provided with a reflux condenser and water trap. These materials were heated at 440° F. for about two hours with nitrogen sparge gas passed thru the vessel to provide agitation and an inert atmosphere. After about two hours, water of reaction stopped coming overhead.

At this point the temperature of the material in the flask was raised to 460° F. and approximately one-third of the dibasic acid was added to the vessel; after about one-half hour the remainder of the dibasic acid was added. Agitation by the nitrogen sparge gas was continued while the reaction temperature was held at close to 450° F.

The polycondensation reaction was followed by acid number and cure time; periodically a small sample was removed from the flask and acid number (mg. KOH/g.) was determined. Also the cure time was determined. Briefly the cure time is determined by spreading one drop of material on a hot plate whose surface is held closely at 200° C. Simultaneously with the forming of the film of material on the hot plate a timer is started and an ordinary nail is stroked thru the film. At first the groove cut by the nail flows together rapidly. Finally the film hardens and the nail cuts a groove which does not flow together again. The cure time represents the number of seconds from the formation of the film to the first groove which does not flow together again. The polycondensation reaction was continued until the reaction product had an acid number between about 12 and 20 and a cure time between about 50 and 70 seconds; in this instance the time for the polycondensation reaction was approximately four hours.

The styrenated material was obtained by reacting the alkyd resin dissolved in varnish makers' grade xylene—70 percent resin content. In the illustrative embodiment about one-third of the p-t-butyl peroxide catalyst was added to the alkyd resin solution and the remainder was dissolved in styrene monomer. The alkyd resin solution was heated to reflux temperature using some nitrogen sparge gas. The styrene monomers were added slowly thru the reflux condenser over a three hour period; in this instance the styrenation reaction temperature was about 300° F. After all the styrene had been added, the final product cure time was rapidly brought to within the region of 0–15 seconds by raising the temperature while stripping off xylene.

There are set out below the results of preparing an illustrative composition of the invention utilizing the following weights of reactants: castor oil fatty acids 100 parts by weight; tall oil fatty acids 295; technical pentaerythritol 260; benzoic acid 227 and isophthalic acid 259. This usage of materials provides an ester having a free hydroxyl group content of 2.84 and a 50 percent oil-length. The excess usage of polyol is 15 percent.

A phthalic anhydride material was prepared with close to the same amounts of these materials except that phthalic anhydride was substituted for the isophthalic acid. The illustrative embodiment of the invention is shown as alkyd resin II below and the conventional phthalic anhydride material is shown as I below. The final styrenated product of the conventional PAN material of I required 40 percent styrene monomer based on PAN alkyd resin to reach the desired properties. The styrenated product of the invention of II required only 33 percent of styrene based on resin to reach the final desired properties.

There are set out below the reactants and some of the physical characteristics of the resins, both alkyd and styrenated. The viscosity of the alkyd resin was taken on a 70 percent solid content xylene solution. The viscosity of the styrenated resin was taken on a 60 percent solid content xylene solution. The physical properties of surface coating films were obtained both on the air dry and baked hardness. The air dry hardness was obtained on films drawn from solutions containing 0.05 percent cobalt as a drier. The baked finishes were obtained from solutions containing 0.02 percent cobalt as a drier.

These illustrative compositions show in air dry application, the composition of the invention is about as good as the conventional PAN material. On the baked finishes, however, the composition of the invention produces a much better film both with respect to hardness and alkali resistance.

|  | I | II |
|---|---|---|
| Alkyd Resin: | | |
| Acid, phthalic | PAN | IPA. |
| "Polyol" | PE-BA | PE-BA. |
| Percent Oil | 50 | 50. |
| COFA/TOFA | 25/75 | 25/75. |
| Excess Polyol, percent | 6 | 15. |
| Acid No. (mg. KOH/g.) | 12.4 | 16.8. |
| Viscosity, Gardner | Y-Z | Z-3-4. |
| Color, Gardner | 9 | 5-6. |
| Cure (seconds) | 75 | 65. |
| Styrenated Resin: | | |
| Acid No | | 11.4. |
| Viscosity, Gardner | Z-1 | Z-5-6. |
| Color, Gardner | 7-8 | 4-5. |
| Cure (seconds) | 0 | 0. |
| Percent Styrene taken up | 40 | 33.2. |
| Hardness (Air Dry), Sward 1 Day .05% Co. | 35.5 | 31.0. |
| Bake Hardness, Sward (0.02% Co.) 30 min., 300° F.: | | |
| 1 Hour | 36.0 | 40.0. |
| 1 Week | 34.1 | 45.8. |
| Resistance (1): | | |
| Alkali | Partial Removal | Good. |
| Gasoline | OK | OK. |
| Flexibility (Conical Mandrel) [1] | Pass | Pass. |
| Impact Resistance in Lbs.[1] | 88 | 144. |
| Baked 30 min., 300° F. (0.02% Co.): | | |
| Impact Resistance | >160 | >160. |
| Flexibility | OK | OK. |

[1] Air Dry Film.

Compositions similar to alkyd resin II above were prepared except that the ester had a free hydroxyl content of three in one case and 2.5 in another. The resin from the material having a free hydroxyl content of three could not be styrenated to a satisfactory cure time at a suitable acid number; this material cured too rapidly. In the case of the resin made with the ester free hydroxyl content of 2.5, the styrenated material could not be made to cure fast enough at a suitable acid number.

The styrenated alkyd resin product is dissolved in a suitable inert organic solvent and is then ready for use for surface coating. The organic solvent may be an aromatic hydrocarbon such as benzene, toluene, and xylene; or it may be chlorinated such as chlorobenzene; or it may be an oxygenated material such as acetone or cyclohexanone; or it may be a material such as dichloroethyl ether.

Thus having described the invention, what is claimed is:

1. A styrenated oil-modified alkyd resin prepared by the reaction of (A) (i) castor oil fatty acids (ii) tall oil fatty acids wherein the weight ratio of said castor oil fatty acids and said tall oil fatty acids is from about 20/80 to 30/70, (iii) pentaerythritol, and (iv) benzoic acid, wherein said pentaerythritol and said benzoic acid are present in amounts such that the theoretical ester product thereof contains an average of from 2.7 to 2.9 free hydroxyl groups, the above defined reactants being maintained at a temperature between about 400° F. and 475° F., in an inert atmosphere with continuous removal of water of reaction until substantial cessation of the evolution of water, (B) producing an alkyd resin by reacting the product mixture of (A) with isophthalic acid in an amount such that the oil-length of the alkyd resin is about 50 percent and the defined ester is present in an excess of between about 10 to 20 mol percent, at a temperature between about 400° F. and 525° F., in an inert atmosphere and with continuous withdrawal of water of reaction, until the acid number of the alkyd resin condensation product is between about 12 and 20 and the cure time is between about 50 and 70 seconds, (C) reacting said alkyd resin product of (B) with styrene, said styrene being present in an amount from about 30 to 45 weight percent based on said alkyd resin, in the presence of a suitable peroxy catalyst for said styrenation in an inert atmosphere at a temperature between about 275° F. and 350° F. for a time such that the styrenated oil-modified alkyd resin product has a cure time of from 0–15 seconds.

2. The styrenated oil-modified alkyd resin of claim 1 wherein said castor oil fatty acids to tall oil fatty acids weight ratio is about 25/75.

3. The styrenated oil-modified alkyd resin of claim 1 wherein the amounts of pentaerythritol and benzoic acid are such that the theoretical average ester product contains about 2.8 free hydroxyl groups.

4. The styrenated oil-modified alkyd resin of claim 1 wherein styrene is present in an amount of 35 weight percent.

5. The styrenated oil-modified alkyd resin of claim 1 wherein said styrenation reaction time and temperature are substantially: three hours at 300° F., two hours at 315° F., and one hour at 325° F.

6. The styrenated oil-modified alkyd resin of claim 1 whose cure time is from 0–5 seconds.

References Cited in the file of this patent
UNITED STATES PATENTS

| | | |
|---|---|---|
| 2,381,884 | Rothrock | Aug. 14, 1945 |
| 2,516,309 | Fraser | July 25, 1950 |
| 2,529,512 | Ott | Nov. 14, 1950 |
| 2,743,249 | Kirsch | Apr. 24, 1956 |
| 2,861,047 | Heckles | Nov. 18, 1958 |
| 2,895,932 | Schlatter et al. | July 21, 1959 |